(12) United States Patent
Dillmann et al.

(10) Patent No.: US 8,727,082 B2
(45) Date of Patent: May 20, 2014

(54) FRICTION DAMPER, PARTICULARLY FOR DRUM WASHING MACHINES

(75) Inventors: Gerold Dillmann, Wangen (DE); Ba Loc Nguyen, Neukirch (DE); Peter Nenning, Scheidegg (DE)

(73) Assignee: Suspa GmbH, Altdorf (DE)

( * ) Notice: Subject to any disclaimer, the term of this patent is extended or adjusted under 35 U.S.C. 154(b) by 704 days.

(21) Appl. No.: 12/450,025

(22) PCT Filed: Mar. 7, 2008

(86) PCT No.: PCT/DE2008/000408
§ 371 (c)(1),
(2), (4) Date: Nov. 4, 2009

(87) PCT Pub. No.: WO2008/106959
PCT Pub. Date: Sep. 12, 2008

(65) Prior Publication Data
US 2010/0252382 A1    Oct. 7, 2010

(30) Foreign Application Priority Data

Mar. 8, 2007  (DE) .......................... 10 2007 011 713

(51) Int. Cl.
*F16F 11/00*    (2006.01)

(52) U.S. Cl.
USPC ............................. 188/381; 267/196; 267/201

(58) Field of Classification Search
USPC ................... 188/381, 322.16, 322.17, 322.18, 188/322.19, 129
See application file for complete search history.

(56) References Cited

U.S. PATENT DOCUMENTS

| | | | |
|---|---|---|---|
| 3,020,451 A * | 2/1962 | McAdam | 361/709 |
| 3,332,523 A * | 7/1967 | Chambers | 188/129 |
| 3,796,288 A * | 3/1974 | Hollnagel | 188/129 |
| 4,475,363 A | 10/1984 | Thomson | |
| 4,729,458 A * | 3/1988 | Bauer et al. | 188/129 |
| 5,133,435 A | 7/1992 | Taylor | |
| 5,183,137 A * | 2/1993 | Siwek et al. | 188/381 |
| 5,961,105 A * | 10/1999 | Ehrnsberger et al. | 267/216 |
| 6,264,014 B1 * | 7/2001 | Ferlicca | 188/129 |
| 6,955,248 B2 * | 10/2005 | Park et al. | 188/267 |
| 7,243,763 B2 * | 7/2007 | Carlson | 188/266.1 |
| 7,341,132 B2 * | 3/2008 | Peuker et al. | 188/381 |
| 7,565,823 B2 * | 7/2009 | Dillmann et al. | 68/24 |
| 7,971,693 B2 * | 7/2011 | Peuker et al. | 188/381 |
| 2005/0211517 A1 * | 9/2005 | Carlson | 188/267 |
| 2008/0287585 A1 * | 11/2008 | Brown | 524/424 |
| 2010/0258396 A1 * | 10/2010 | Lonski | 188/381 |

FOREIGN PATENT DOCUMENTS

| | | |
|---|---|---|
| DE | 1 947 133 A1 | 4/1970 |
| DE | 2 314 955 A1 | 4/1974 |
| DE | 85 08 931 U1 | 6/1985 |
| DE | 692 32 569 T2 | 5/1998 |
| DE | 298 04 214 U1 | 6/1998 |
| DE | 10 2004 033 531 A1 | 2/2005 |

* cited by examiner

*Primary Examiner* — Pamela Rodriguez
(74) *Attorney, Agent, or Firm* — Browdy and Neimark, PLLC (57) ABSTRACT

The invention relates to a friction damper (1) and method related to the preparation of a friction damper, particularly for drum washing machines having a spin gear, with a housing and with a moveable tappet (4) which is arranged in the housing (2), parallel to the housing longitudinal axis (2a), and is led out of the housing (2) and which is provided at its end located in the housing with a moveably guided friction lining (8). The invention is distinguished in that the friction lining (8) or a body carrying the friction lining (8) is provided with a receptacle (22) for receiving an expandable body (23).

3 Claims, 5 Drawing Sheets

FRICTION DAMPER, PARTICULARLY FOR DRUM WASHING MACHINES

BACKGROUND OF THE INVENTION (1) Field of the Invention

The present invention relates to a friction damper and to a method for producing it, which is particularly applicable to washing machines with a spin gear. More particularly, the friction damper has a housing and preferably structure-reinforcing rubs and/or lamellae and a moveable tappet which is arranged in the housing parallel to the longitudinal axis of the housing and is led out of the housing with an end located in the housing with a moveably guided friction lining and preferably a friction lining and/or a baffle element constructed of an elastomer, foam material or rubber and preferably where the housing and/or tappet is manufactured from plastic.

(2) Description of Related Art Including Information Disclosed Under 37 C.F.R. 1.97 and 1.98

Friction dampers preferably have the task of absorbing or eliminating oscillations on mechanically moved elements, such as, for example, deflections of washing drums on washing machines which are caused by unbalances. Such a friction damper is known, for example, from DE 10 2004 033 531.

BRIEF SUMMARY OF THE INVENTION

The object on which the present invention is based is to improve a friction damper of the type initially mentioned.

This object is achieved by having a friction damper with a housing and preferably a housing with structure reinforced ribs and/or lamellae and a moveable tappet disposed in the housing parallel to the longitudinal axis of the housing which is led out of the housing with an end located in the housing with a friction lining and preferably a moveably guided friction lining in which the friction lining or body carrying the friction lining is provided with a receptacle for receiving an expandable body as well as a method for producing a friction damper having a moveable tappet with a moveably guided friction lining and providing for detecting and categorizing the coefficient of friction of the friction lining. Advantageous and expedient developments are further provided by manufacturing the housing from plastic, by having structural elements in the contact region with the friction lining, having lubricant pockets on the housing in the contact region, having a housing with thermally conducting material fractions, providing surface-enlarging ribs and/or lamellae on the housing, having the friction lining as a baffle element to provide a braking movement of the friction lining, having a one piece friction lining, having a friction lining guidably moveable on a guide element, having a guide element that is under a prestres between the friction lining and a guide or sliding surface having the friction lining disposed in an aperture, having the guide element disposed in an aperture, having a receptacle for the guide element disposed on or in the friction lining, having a receptacle partly divide the body of the friction lining, having an expandable body for setting a frictionally active geometric dimension and/or for bracing the friction body to influence the frictional force between the friction lining and the assigned sliding surface, having the expandable body designed as a fixing or anchor element assigned to the friction lining of the guide element, providing a stop as an abutment for a baffle element, providing a free stroke for the friction lining, having a baffle element positioned so as to bear against a stop when in the non-loaded state of the friction damper, having a friction damper with a linear force/path characteristic curve, having a friction damper with a non-linear force/path characteristic, providing a sensor for detecting the change in length of the friction damper, having a friction lining and/or baffle element made of an elastomer and/or foam and/or rubber material as well as the method of the invention for producing a friction damper by arranging a moveable tappet in a friction damper housing having one end out of the housing and the other end in the housing with a moveably guided friction lining and having the friction lining and/or the body carrying the friction lining provided with a receptacle for receiving an expandable body, by manufacturing the housing and/or tappet from plastic, by producing a friction damper as previously described where the coefficient of friction of the lining is detected and categorized and providing a friction lining and/or body with an expandable body.

Accordingly, the present invention relates to a friction damper, particularly for drum washing machines having a spin gear, with a housing and with a moveable tappet which is arranged in the housing parallel to the housing longitudinal axis, and is led out of the housing and which is provided at its end located in the housing with a friction lining. The friction damper is distinguished in that the friction lining or a body carrying the friction lining is provided with a receptacle for receiving an expandable body.

By means of an expandable body, it is possible to deform the friction lining or a body carrying the friction lining or to brace it if limits are placed on the deformability of the friction lining and/or of a body relating to the friction lining by external structural elements.

As a result of deformation, the effective surface of the friction lining can be influenced, while, as a result of bracing, the pressure of the frictional surfaces of the friction lining on an assigned sliding surface, on which the friction lining can slide under friction during operation, can be influenced. The friction behavior of the friction lining is to be influenced by means of both effects. Of course, both effects may also be utilized simultaneously.

In an advantageous embodiment of the invention, the housing is manufactured from plastic.

Producing a housing from plastic affords a whole series of advantages. On the one hand, forms and geometries can be implemented in virtually any desired configuration, specifically in the case of both multipart and one-part, for example closed housing forms. The injection molding technique is particularly appropriate for this purpose. Consequently, particularly due to the formation of one-part structural components, the overall number of individual parts of such a friction damper can also be reduced. A further advantage is the comparatively low investment costs for the provision of the means required for production.

According to the virtually unrestricted possibility for the configuration of plastic surfaces, the housing of the friction damper can be adapted ideally in its structure to the operational requirements. For example, it may be provided with structural elements which may also serve different functions. In a first embodiment, for example in the contact region of the housing with the friction lining, a structure positively influencing the sliding properties of the friction lining on the contact surface of the housing may be provided. For example, the arrangement of rounded ribs may be envisaged, so that the friction lining is acted upon with as smooth an increase in resistance as possible during its relative movement with respect to the housing, and therefore the additional introduction of oscillations due to static friction resistances being overcome can be avoided.

However, the formation or arrangement of lubricant pockets for reducing the adhesive or sliding resistance between the friction lining, pressed against a housing region in the installed state, and this housing region can thereby be implemented simply and advantageously.

So that the problem of the friction-induced generation of heat, even in the case of a housing manufactured from plastic, can be kept as low as possible, the use of thermally conductive material fractions in the plastic is further provided, so that heat occurring during friction can thereby readily be discharged outward.

Further measures for improving the thermal and/or mechanical properties of the friction damper include the formation of lamellae and/or ribs enlarging and/or stiffening or reinforcing the surface of the housing. By the surface being enlarged, better heat discharge is possible and, by contours being routed rectilinearly, in addition to the radiating property of such cooling ribs or cooling lamellae, a throughput of the air surrounding the friction damper can also be triggered or reinforced, in order also to bring about an additional cooling effect. The arrangement of clearances in the housing, for example between individual reinforcing or cooling ribs and/or lamellae, also sometimes decisively assists in the discharge of the heat generated as a result of damping friction.

In terms of the reinforcing properties of such cooling or stiffening ribs or lamellae, in particular, a housing manufactured from plastic can easily be adapted to specific requirements in its contour or in the contour of the stiffening lamellae and/or ribs. By such ribs or lamellae being integrated into the housing, both can be produced in a single operation.

As a further feature essential to the invention, the friction lining optionally includes a baffle element for braking a movement of the friction lining, in particular as an element integrated in it. The friction lining can thereby advantageously be formed as a one-piece part, this, in turn, advantageously contributing to reducing the overall number of individual parts of the friction damper.

The baffle element is preferably arranged on one end face in the direction of movement of the friction lining, in a particularly preferred embodiment on both end faces. By an appropriate contouring of this baffle element or these baffle elements, on the one hand, the damping property of these baffle elements can be influenced preferably taking into account the damping properties of the material used, and, on the other hand, a further contribution to reducing the static friction can be made on account of corresponding contouring of the edge regions first coming into contact with the housing during a displacement movement. Beveled or rounded edges are considered particularly advantageous for this purpose, which allow as smooth an increase in resistance as possible during a longitudinal displacement of the friction lining.

For further positively influencing the sliding properties of the friction lining inside the housing or on the tappet, particularly in an aperture of the tappet, a guide element is optionally provided for the friction lining. It is thereby provided, for example, to reduce the frictional resistance between the friction lining and the correspondingly assigned sliding surface on the tappet, which sliding surface may be arranged, in particular, inside the aperture. A particularly advantageous effect is obtained if there is no direct contact between the friction lining and the guide surface, so that, on the one hand, the frictional resistance between these two elements is reduced and, on the other hand, once again, the superposition of jolt-induced oscillations, brought about by intermittent static friction between the friction lining and a complementary sliding surface, are reliably prevented.

It is particularly advantageous, further, if the guide element is tension-mounted under prestress between the friction lining and the guide or sliding surface assigned to it. This affords a permanently exact guidance for the friction lining where the friction damper is correspondingly acted upon by oscillations, specifically also in the case of long-term operational wear of the guide elements and/or of the sliding or guide surface, assigned to it, for the friction lining. The prestress between the guide element and the guide or sliding surface may be implemented, for example, by means of an elastic property of the friction lining.

In one alternative embodiment, for this purpose, a receptacle for the guide element is provided in or on the friction lining or a body carrying the friction lining. This receptacle is designed, for example, as a slot at least partially dividing the friction lining and/or the body of the friction lining. In such an embodiment, the friction lining forms, around this slot-shaped receptacle, a kind of annular shape which, very roughly described, corresponds to an erasing rubber contour slotted in the middle in the longitudinal direction and comprising beveled end faces having, for example, a triangular shape.

This gives rise to a special embodiment of a receptacle for an expandable body which can be introduced into the friction lining in order to influence the frictional behavior and, in particular, set the frictionally active geometric dimension and/or the bracing of the latter. That is to say, by means of an expandable body of this type, the frictionally active extent, for example the thickness of the friction lining, or due to the bracing of the latter, the pressure of the friction lining on the associated sliding surface can be influenced according to corresponding stipulations. In particular, it is thereby possible to compensate manufacture-related tolerances of the friction lining. However, an adaptation of a specific friction lining to a most specific application having predetermined friction values is also possible as a result.

With regard to manufacture-related dimensional tolerances, for example, a categorization is possible, which allocates the friction linings, for example, to five different classes after appropriate testing. Then, according to the respective class, an expandable body coordinated especially in its geometric dimensions can be provided for a quite specific application. The geometric dimensions in this case relate particularly to the height dimensions of the expandable element which influence the thickness of the friction lining. For example, such an expandable body may be in the form of a rectangle, if appropriate provided with beveled edges, which is pushable into the friction lining receptacle designed as a slot.

In a particularly preferred embodiment, this expandable body is designed as a fixing or anchor element, assigned to the friction lining, of the guide element for the friction lining. Consequently, this guide element can simultaneously combine both functions—guidance and expansion of the friction lining. An additional advantage is that, on account of the elasticity of the friction lining, the prestress for the guidance function of the guide element can also be implemented, so that, as a function of operationally induced wear, the guide element is again pressed rearward out of the slot-shaped receptacle from the friction body and against the sliding or guide surface, assigned to it, on the aperture of the tappet.

Further, it is considered advantageous if a stop as an abutment for a baffle element is provided. This stop may be formed, in particular, on the end face lying opposite the baffle element, for example inside a reception aperture, provided if appropriate, for the friction lining. For this purpose, for example, a plurality of axially aligned ribs, arranged so as to be distributed along the end edge of the baffle element, may be provided. These afford the advantage that they can be varied in their longitudinal extent in a comparatively simple way for a length adaptation, required if appropriate, of the reception aperture for the friction lining, for example by means of a material removal method following the production method. A bearing contact over a continuously planar area may, however, also be envisaged as an abutment for the edge, assigned to it, of the baffle element. If sufficient material is provided, a corresponding removal of material may also be carried out by this for length adaptation.

Depending on the desired embodiment and functioning of the friction damper, a free stroke for the friction lining may be provided. That is to say the friction lining is smaller in its longitudinal extent by the amount of a specific dimension than the inner dimension between the stop surfaces of the friction lining receptacle. Such a free stroke has the advantage that oscillations occurring in the particular application and lying in the amplitude within this free stroke are not damped by the friction damper by means of its friction lining. Since, particularly in washing machines, this amounts to the largest fraction of oscillations occurring on washing machine drums, no frictional heat is thereby induced into the friction damper system. However, these low-stroke oscillations usually do not play any part in the mechanical load of the washing drum suspension and the mounting, and they are therefore perfectly acceptable particularly in cost-effective solutions.

In a modified embodiment, however, it is also possible that the baffle element is designed without a free stroke, that is to say, in the non-loaded state of the friction damper, the baffle element is positioned so as to bear against the stop, specifically on both end faces restricting its movement travel.

The friction damper may, further, have, for example, a linear force/path characteristic curve. However, a non-linear force/path characteristic curve for the friction damper may also be envisaged.

The knowledge of this force/path characteristic curve, particularly in combination with a sensor provided for detecting a change in length of the friction damper, the action of force causing the length change can be deduced. In a static application, it is therefore possible, for example, in combination with a corresponding check unit, to determine the loading state of a unit, for example a washing drum, influenced by the friction damper. Further, for example, on the basis of this information, the further operating cycle of the respective appliance, for example the washing machine, can be influenced to the effect that various operating parameters are adapted exactly to this load. In this case, for example, it is conceivable to influence detergent, water or the like which is to be added.

For dynamic application, that is to say, for example, the operating situation of a spinning action, the detection of the changing length of the friction damper can be brought about by means of a correspondingly connected check unit in order to initiate correcting measures with regard to an unfavorable unbalance which puts at risk or overshoots the operating strength of the friction damper. As a first reaction, a time reduction of individual spin segments is provided, if appropriate with the interposition of intermissions in which, for example, the induced excessive heat is discharged. Another application is to initiate a new operation to distribute the load of the plant part, the oscillation of which is to be damped, that is to say to initiate in the washing machine, for example, a new distribution of the laundry in the washing drum, by means of measures already known. As a result of such interventions in the operation causing the amplitudes to be damped, optimization in the adaptation of the mechanical strength of such a friction damper to maximum loads occurring in the system to be damped by it is achieved. That is to say, once again, a saving of material and of cost is thereby achieved.

In a particularly preferred embodiment, the baffle element and/or the friction lining consists essentially of an elastomer and/or foam, in particular a polyurethane or PU foam, and/or a rubber material. By means of these materials, relatively simple machining in the production of these structural parts is possible. Further, this also has a positive effect on the overall material costs required for such a friction damper.

Further, the present patent application also relates to a method for producing a friction damper according to the embodiments described above. A production method for such a friction damper is distinguished in that the housing is manufactured from plastic. This affords the advantages set out above with regard to the friction damper.

Moreover, it is considered advantageous if the tappet of the friction damper is also manufactured from plastic, so that the entire friction damper consists, overall, of plastic parts. Advantages set out above with regard to the friction damper also apply to a tappet manufactured from plastic.

In a further preferred method for manufacturing such a friction damper, there is provision for the coefficient of friction of the friction lining to be detected and categorized. It is thereby provided, for example, to ensure that even friction linings having oversize or undersize with respect to a required coefficient of friction do not have to be removed as rejects from the manufacturing line, but, instead, can be treated by means of measures provided according to their categorization, such that they acquire or achieve exactly the required coefficient of friction for their intended use.

Such adaptation of the coefficient of friction is achieved particularly by equipping the friction lining with a correspondingly designed expandable body. This expandable body may, for example, have a geometric dimension dependent on the required coefficient of friction of the friction lining and which is effective with regard to expansion thicknesses. That is to say, the friction lining is equipped with an expandable body which adds exactly as much thickness to the friction lining so as to ensure that the friction lining, after being equipped, has the required coefficient of friction. By such an expandable body being arranged in the friction lining, in addition to the tolerance adjustment of the friction linings with regard to their coefficients of friction, adaptations of such friction linings to quite specific application requirements are, however, also achieved. For example, thus, by means of one and the same friction lining, an application can be equipped satisfactorily with a required low coefficient of friction and also, for example by means of a correspondingly thicker expandable body, an application can be equipped with a required comparatively high coefficient of friction.

BRIEF DESCRIPTION OF THE SEVERAL VIEWS OF THE DRAWING(S)

An exemplary embodiment of the invention is illustrated in the following drawings and is explained in more detail below by means of the figures.

In particular.

DETAILED DESCRIPTION OF THE INVENTION INCLUDING BEST MODE

Figure 1:
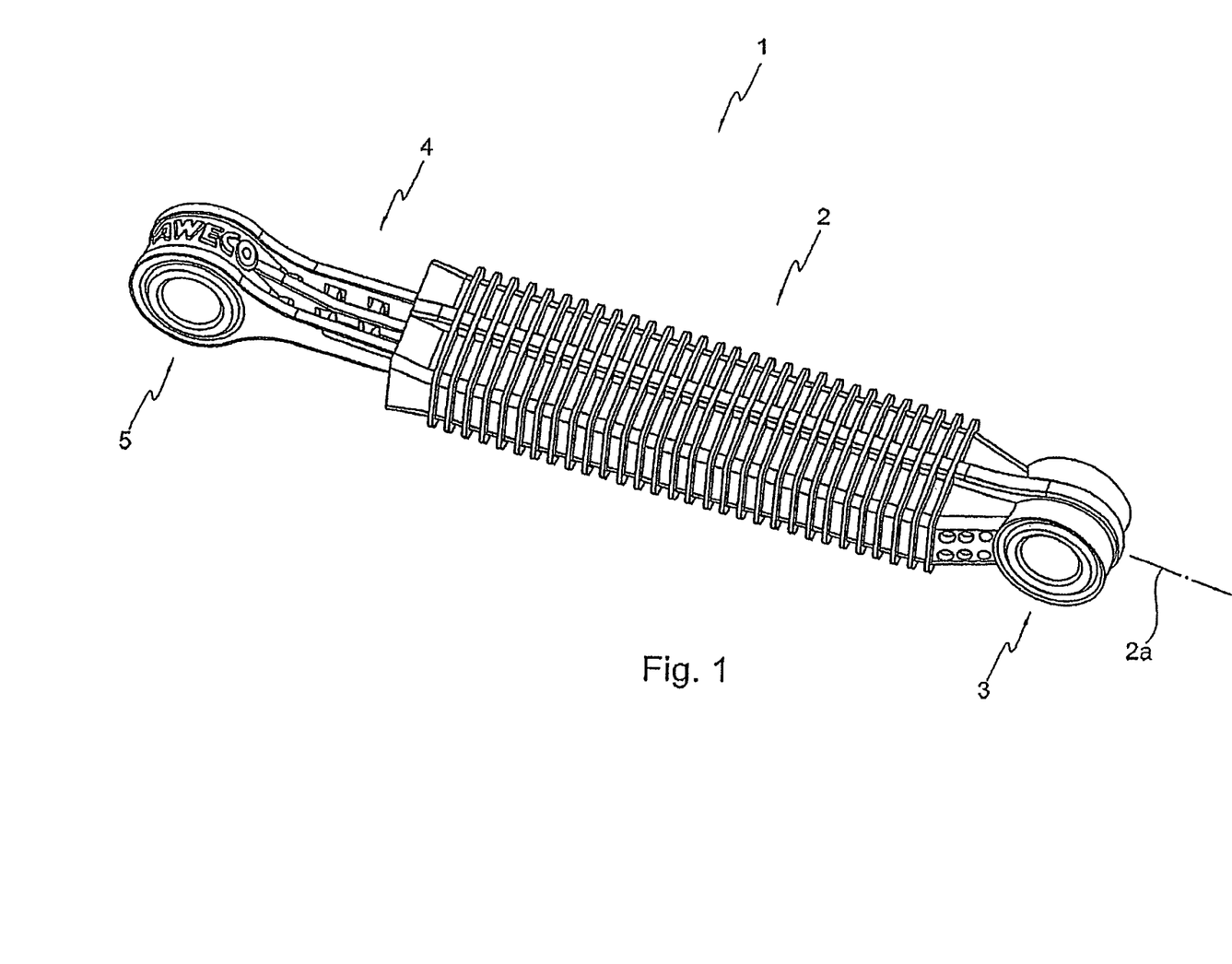
FIG. 1 shows by way of example a perspective view of a friction damper.

FIG. 1 shows in detail, then, a friction damper 1 consisting of a housing 2 and of a fastening lug 3 assigned to the latter and also of a tappet 4 arranged moveably in the housing 3 and having a fastening lug 5.

The inside of the housing 2 is provided at least in portions as a bearing surface for a friction lining (FIGS. 6 to 8) arranged on the tappet 4, and the entire housing 2 is manufactured in the preferred embodiment, according to the invention, from plastic.

Figures 2, 3, 5:
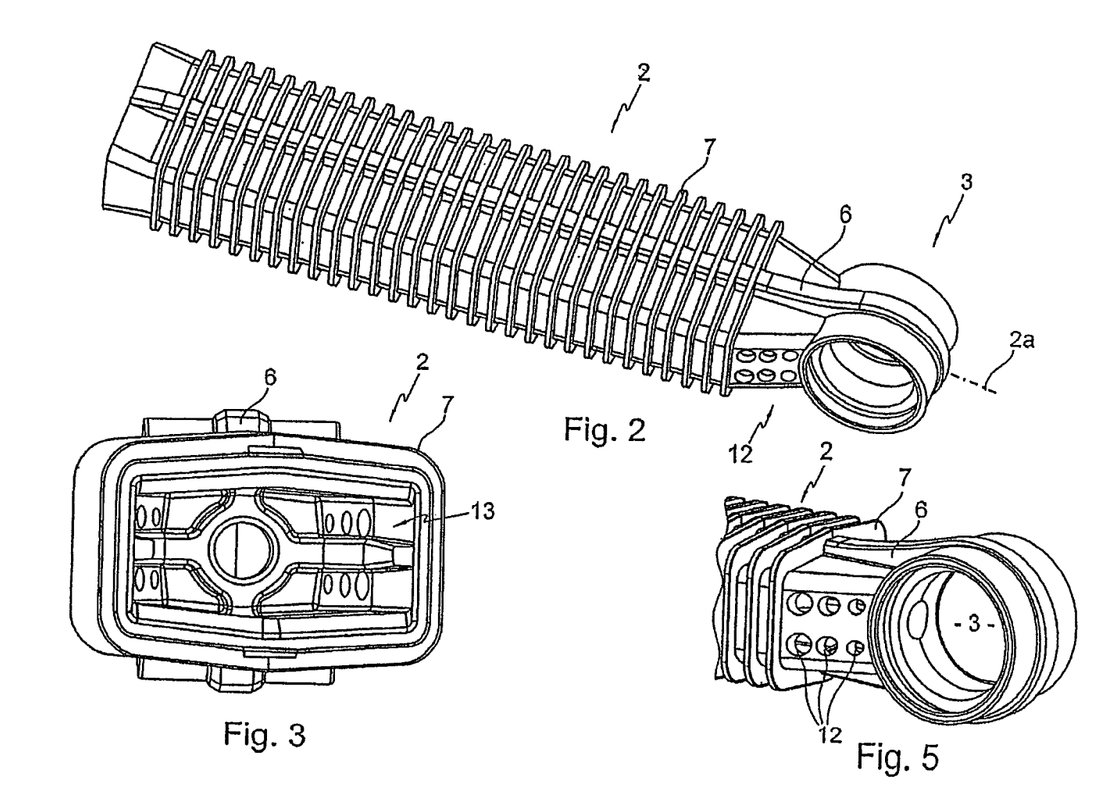
FIG. 2 shows a perspective view of a housing of a friction damper.
FIG. 3 shows an internal view of the housing of the friction damper.
FIG. 5 shows partially a perspective external view of the friction damper housing in its fastening-side end portion.

FIG. 2 shows a perspective top view of the housing 2, manufactured from plastic, of a friction damper 1. The housing 2 is provided for example for reinforcement and/or for the discharge of heat, with a longitudinal rib 6 running approximately parallel to a housing longitudinal axis 2a and arranged on the outside around the housing. Further, transverse ribs 7 are arranged, distributed over the housing outer surface, transversely to this longitudinal rib and therefore also transversely to the housing longitudinal direction. The structure of the longitudinal and transverse ribs is illustrated by way of example and may perfectly well also have other forms, for example optimized in terms of installation conditions or operating conditions. The housing itself, although illustrated here as being essentially closed, has ventilation and venting holes 12 only in its fastening-side end region. It is conceivable, however, also to have a housing open, for example, over larger regions, so that, for example, a better thermal functioning by means of a better discharge of heat can be implemented.

FIG. 3 shows an internal view of the housing 2 with a first exemplary internal structure 13. Further exemplary shapes of structural elements 13 formed in the contact region with the friction lining 8 are illustrated by way of example in FIG. 4. Possible contours are, for example, straight-shaped ribs and/or lamellae oriented obliquely in a top view, if appropriate superposed with wavy shapes, crossed elements, if appropriate superposed with further crosses or wavy shapes, straight ribs and/or lamellae running essentially transversely to the longitudinal extent of the inner housing, transversely oriented wavy ribs or lamellae, and the like. Their interspaces are suitable, for example, for the formation and/or reception of lubricant pockets 9, into which lubricants, for example grease can be deposited in order to reduce the static friction of the friction lining. It is also conceivable, however, to form specially shaped lubricant pockets over specific regions of the contact region on the inside of the housing.

Figure 4:
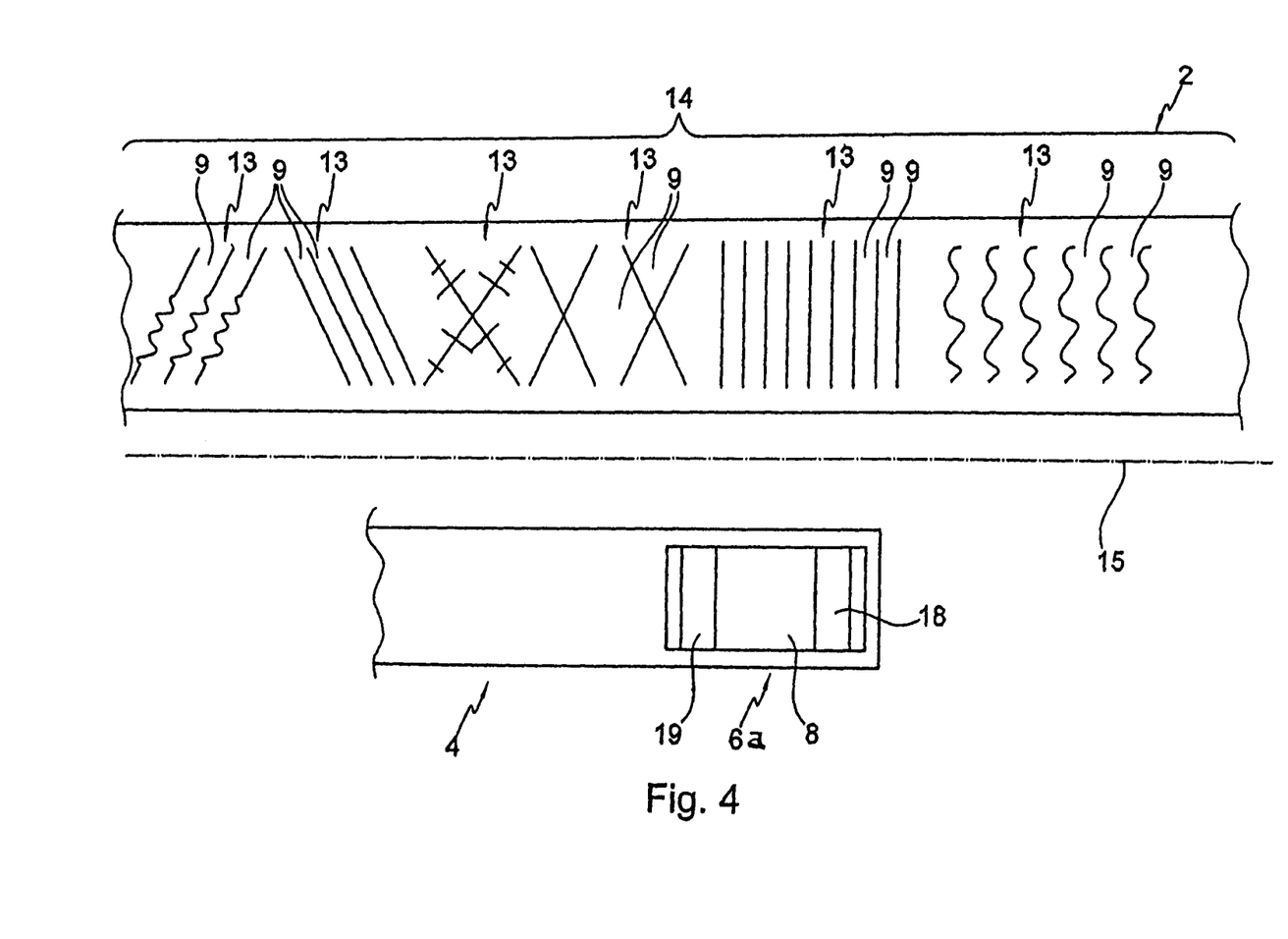
FIG. 4 shows diagrammatically a partial illustration of an internal region, functioning as a contact region, of the housing of the friction damper, reproduced along an axis and opposite to the housing-side end of a tappet mounted moveably in the housing and provided with a friction lining.

The structural elements 13 illustrated in the upper half of FIG. 4 are depicted as being oriented along an axis 15 in relation to the tappet 4. Of the tappet 4, only its end mounted moveably in the housing 2 is illustrated. Arranged on it is a friction lining 8 which, in the event of a change in length of the friction damper 1 is moved with respect to the structural elements 13.

FIG. 5 shows partially, by way of example, a perspective external view of the housing in its fastening region. The surface-enlarging structure, in particular of the transverse ribs 7 for improving heat discharge, can be seen clearly in this. In addition to this heat discharge function, however, a marked increase in the mechanical strength of this housing 2, manufactured from plastic, of the friction damper 1 can also be seen, particularly due to the encircling structure of these transverse and longitudinal ribs 6, 7. For further optimization of the thermal properties of this housing manufactured from plastic, this may additionally contain heat-conducting materials.

Figure 6:
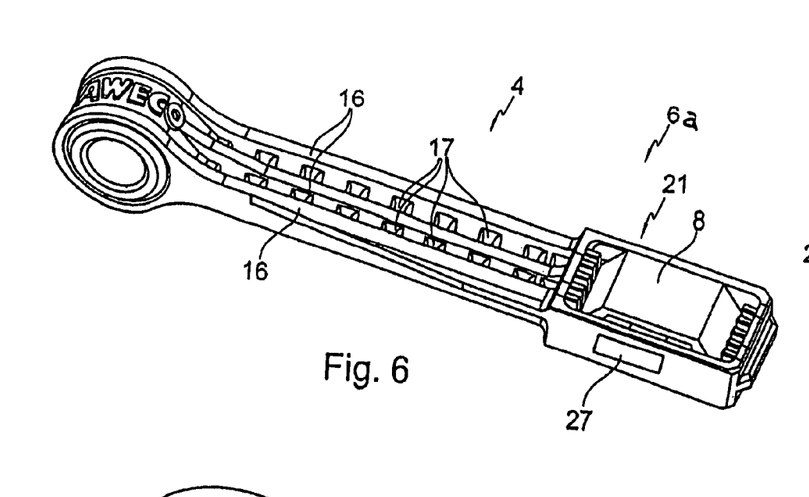
FIG. 6 shows by way of example a perspective view of a tappet of the friction damper.

FIG. 6 shows by way of example a perspective top view of a tappet 4 for moveably guided in the housing 2. The friction lining 8 arranged at least partially moveably on said tappet serves for damping a changing length of the friction damper due to a mechanical oscillation caused, for example, by unbalance.

The tappet 4, too, has reinforcing longitudinal and transverse ribs 16, 17, this again, particularly if the tappet 4 is produced from plastic, can have an advantageous effect both in terms of an improvement in its mechanical strength and in terms of its thermal functioning.

FIG. 7 shows, again by way of example, a perspective top view of one possible embodiment of a friction lining 8. This friction lining 8 comprises at least one baffle element 18, 19 on one end face arranged, as seen in its direction of movement. In the embodiment shown, such a baffle element 18, 19 is formed on both end faces. These baffle elements serve for limiting the movement of the friction lining 8, arranged moveably on the tappet 4, upon contact with correspondingly assigned stop surfaces and to damp the braking movement. Preferably, as shown here in this exemplary embodiment, the friction lining is in this case produced in one piece. That is to say, in this exemplary embodiment, both the friction lining 8 and the two baffle elements 18, 19 are manufactured from one and the same work piece or material.

Figure 7:
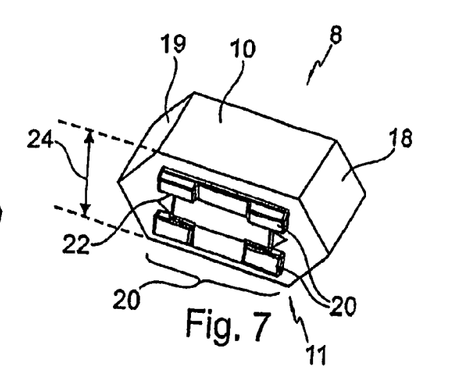
FIG. 7 shows by way of example a perspective view of a friction lining.

Its frictional surfaces 10 and 11 are preferably designed essentially as planar surfaces, so that the friction lining 8 has, for example, a rectangular shape in cross section.

So that a good guide for the friction lining arranged moveably on the tappet 4 can be made possible, guide elements 20 are further provided. These guide elements 20 may, for example, be arranged on the lateral surfaces on the friction lining 8 which lie between the two frictional surfaces 10, 11 or may be connected to said friction lining. In a particularly preferred embodiment, these guide elements 20 are arranged under prestress between the friction lining 8 and a guide or sliding surface 21 assigned to the respective guide element. The advantage of this is that operationally induced wear on the guide element and/or on the guide or sliding surface 21 assigned to it cannot generate an air gap which would have an adverse effect on the guidance properties. One possible adverse effect would be, for example, a jolt-like guidance of the friction lining by the guide or sliding element, so that oscillations would thereby be induced into the damping system. However, the permanent prestress can ensure that such faults are reliably prevented. Furthermore, this ensures that the friction lining itself also cannot cause such jolting movements which could be caused, for example, by tumbling movements of the friction lining on the sliding surface 28 which may possibly otherwise occur.

Figure 8:
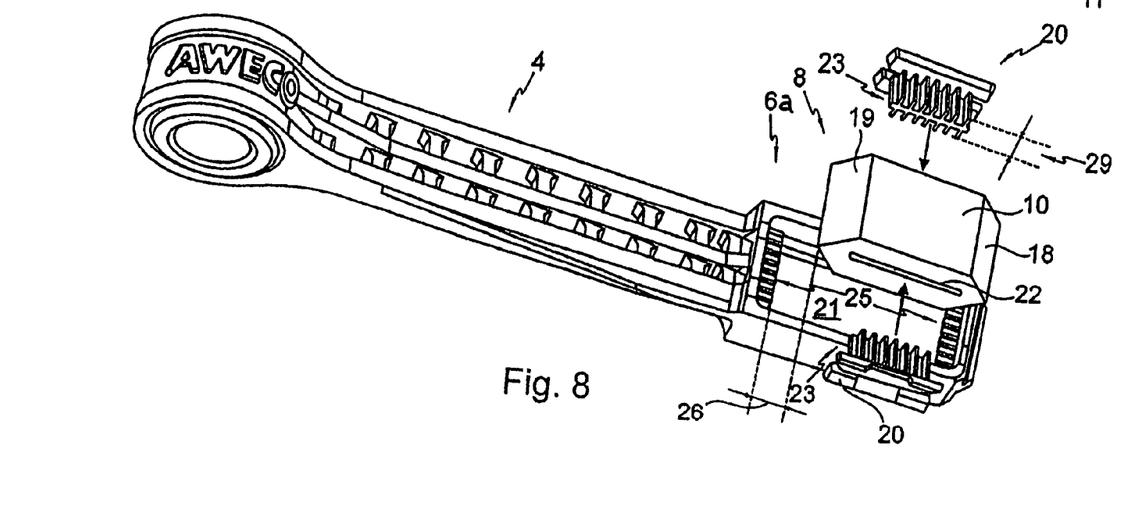
FIG. 8 shows by way of example a perspective view of a tappet with a friction lining extracted in an exploded manner and with guide elements.

In a further-preferred embodiment, the friction lining 8 may be guided in an aperture, in particular in a reception aperture 6a formed on the tappet 4, as illustrated in FIGS. 6 and 8. It is thereby possible to mount the friction lining moveably, but nevertheless fix it firmly on the tappet 4.

In the illustration of FIG. 7, the friction lining 8 is shown as being expanded in relation to the illustration of FIG. 8. Expansion takes place by the guide element 20 being introduced into the receptacle 22 of slot-shaped design which partially divides the friction lining.

Thus, in a particularly preferred embodiment, the guide element 20 at the same time comprises an expandable body 23 for setting the frictionally active geometric dimension 24 between the two frictional surfaces 10 and 11 of the friction lining 8. The expandable body 23 is thus designed as a fixing or anchor element, assigned to the friction lining 8, of the guide element 20.

Further, in each case a stop 25 is provided as an abutment to the baffle elements 18, 19. In the embodiment of FIGS. 6 and 8, these stops 25 are arranged in each case on the end faces in the aperture 6 and can limit a prestroke 26, provided if appropriate, for the friction lining 8. In the event that no free stroke is provided for the friction lining, the baffle elements 18, 19 bear in each case, in the non-loaded state of the friction damper 1, against the stop 25 assigned to it. These embodiments are provided for applications in which all the deflections of an assembly provided with a friction damper of this type are to be damped.

For detection of the effects of force on the damping system illustrated by the friction damper, this damping system may have a linear force/path characteristic curve which can be detected, for example, via a displacement sensor 27 (FIG. 6) for transfer to a correspondingly suitable check unit. Based on this, if appropriate, specific program cycles can subsequently be influenced.

It is also conceivable, however, to have a non-linear force/path characteristic curve for the friction damper. What is critical for detecting the action of force is the knowledge of the overall spring constant of the assembly damped by the friction damper.

To produce the friction lining 8 and/or the baffle element 18, 19, preferably the use of an elastomer and/or of a foam, in particular of a PU foam, and/or of a rubber material is provided.

Figures 9, 10:
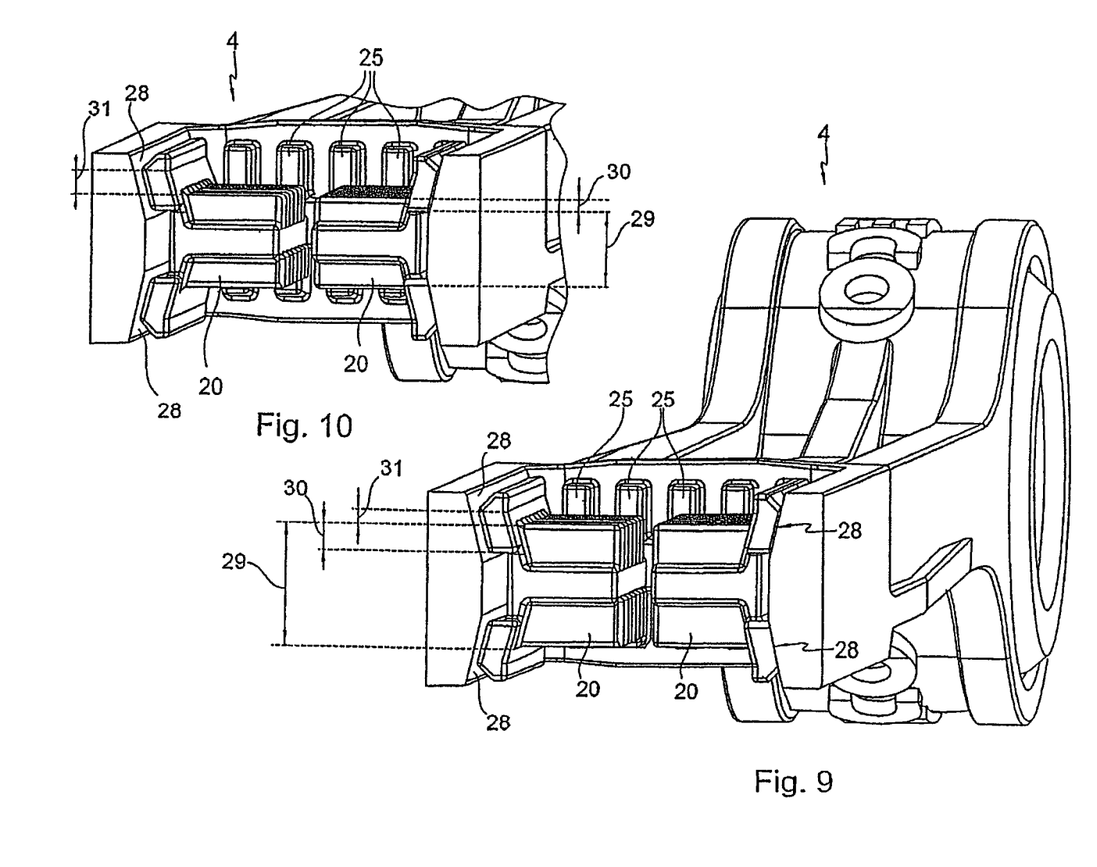
FIGS. 9 and 10 show by way of example partial illustrations in an oblique perspective top view of a tappet with a section through the friction lining reception aperture shown in FIGS. 6 and 8.

FIGS. 9 and 10 show in each case by way of example oblique top views of a tappet 4 in which a section runs transversely through the aperture 6. These illustrations are intended essentially to show that the two guide elements 20, which are illustrated here without the friction lining 8, have different expansion heights 29. These expansion heights 29 influence the frictionally active dimension 24 of the friction lining 8 to the effect that they essentially codetermine the distance between the two frictional surfaces 10, 11 in the state plugged into the friction lining 8. As a result, an adaptation of the friction lining 8 to specific requirements is possible, or else a correction of manufacture-related deviations from the desired value of its frictionally active geometric dimensions is possible.

To make clear the different expansion heights 29, the two distances 30 between one edge of the middle part of the guide element 20 and one of its outer edges are additionally illustrated. Accordingly, the two guide elements shown in FIG. 9 are markedly thicker than the two shown in FIG. 10. A further reference as evidence of this thickness difference may be seen from one outer edge of the guide element 20 to the edge, lying nearest to it, in the guide region facing the sliding surface 28.

In FIG. 9, only a short distance can be seen here, whereas, in FIG. 10, a long distance 31 is evident.

LIST OF REFERENCE SYMBOLS

1. Friction damper
2. Housing
3. Fastening lug
4. Tappet
5. Fastening lug
6. Longitudinal rib
6a Reception aperture
7. Transverse rib
8. Lubricant pocket
9. Friction lining
10. Frictional surface
11. Frictional surface
12. Ventilation or venting hole
13. Structure
14. Contact region
15. Axis
16. Longitudinal rib
17. Transverse rib
18. Baffle element
19. Baffle element
20. Guide element
21. Guide or sliding surface
22. Receptacle
23. Expandable body
24. Frictionally active dimension
25. Stop
26. Free stroke
27. Sensor
28. Sliding surface
29. Expansion height
30. Distance
31. Distance

The invention claimed is:

1. A friction damper (1), comprising a housing (2) with a moveable tappet (4) disposed in the housing (2) parallel to the housing longitudinal axis (2a) the moveable tappet having one end disposed outside of the housing (2) and one end located in the housing (2) with a moveably guided one piece friction lining or a body carrying the moveably guided one piece friction lining (8) with an expandable body (23) and an expandable body receptacle (22) for receiving the expandable body (23), wherein the housing (2) is made from plastic, and wherein the housing (2) has thermally conducting material fractions for discharging heat occurring during friction, wherein the receptacle (22) partly divides the body of the one piece friction lining (8), and wherein the receptacle (22) is slot-shaped, such that the one piece friction lining (8) forms around the slot-shaped receptacle an annular shape.

2. The friction damper as claimed in claim 1, wherein a guide element is introduced into the receptacle (22), such that the slot-shaped receptacle (22) is expanded.

3. A friction damper as claimed in claim 2, wherein the guide element (20) comprises an expandable body (23) for setting frictionally active geometric dimensions (24) between frictional surfaces (10, 11) of the piece friction lining (8), wherein the expandable body (23) is an anchor element assigned to the one piece friction lining (8).

* * * * *